(12) United States Patent
Kosokabe et al.

(10) Patent No.: US 6,635,592 B1
(45) Date of Patent: Oct. 21, 2003

(54) TUNGSTEN SEAL GLASS FOR FLUORESCENT LAMP

(75) Inventors: Hiroyuki Kosokabe, Yamagata (JP); Koichi Hashimoto, Kusatsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/890,223

(22) PCT Filed: Nov. 21, 2000

(86) PCT No.: PCT/JP00/08206

§ 371 (c)(1),
(2), (4) Date: Jul. 27, 2001

(87) PCT Pub. No.: WO01/40128

PCT Pub. Date: Jun. 7, 2001

(30) Foreign Application Priority Data

Nov. 29, 1999 (JP) ............................................. 11-338787

(51) Int. Cl.$^7$ ......................... C03C 3/091; C03C 3/093; C03C 3/105; C03C 3/108
(52) U.S. Cl. .............................. 501/14; 501/22; 501/23; 501/26; 501/62; 501/66; 501/67; 501/69; 501/70
(58) Field of Search ............................. 501/14, 22, 23, 501/26, 62, 64, 66, 67, 69, 70

(56) References Cited

U.S. PATENT DOCUMENTS

| | | | | | |
|---|---|---|---|---|---|
| 2,397,100 A | * | 3/1946 | Oldfield et al. | .............. | 132/280 |
| 3,506,385 A | * | 4/1970 | Weber et al. | ................ | 431/362 |
| 4,282,395 A | * | 8/1981 | Hagemann | ................ | 174/50.61 |
| 4,310,773 A | * | 1/1982 | Zukowski et al. | .......... | 313/594 |
| 5,182,237 A | * | 1/1993 | Brix | ........................... | 501/66 |
| 5,459,110 A | | 10/1995 | Brix | | |
| 5,528,107 A | | 6/1996 | Marlor et al. | | |
| 5,557,171 A | * | 9/1996 | Marlor et al. | ................ | 313/112 |
| 5,747,399 A | | 5/1998 | Kosokabe et al. | | |
| 6,118,216 A | * | 9/2000 | Marlor | ........................ | 313/25 |

FOREIGN PATENT DOCUMENTS

JP  06-092677  4/1994

* cited by examiner

*Primary Examiner*—David Sample
(74) *Attorney, Agent, or Firm*—Collard & Roe, P.C.

(57) ABSTRACT

A tungsten sealing glass for use in a fluorescent lamp has a composition of, by mass percent, 65–76% $SiO_2$, 10–25% $B_2O_3$, 2–6% $Al_2O_3$, 0.5–5.8% $MgO+CaO+SrO+BaO+ZnO$, 3–8% $Li_2O+Na_2O+K_2O$, 0.01–4% $Fe_2O_3+CeO_2$, 0–10% $TiO_2+Sb_2O_3+PbO$, and 0–2% $ZrO_2$, where $Na_2O/(Na_2O+K_2O) \leq 0.6$.

3 Claims, No Drawings

TUNGSTEN SEAL GLASS FOR FLUORESCENT LAMP

CROSS REFERENCE TO RELATED APPLICATIONS

Applicants claim priority under 35 U.S.C. §119 of Japanese Application No. 338787 filed Nov. 29, 1999. Applicants also claim priority under 35 U.S.C. §365 of PCT/JP00/08206 filed Nov. 21, 2000. The international application under PCT article 21(2) was not published in English.

TECHNICAL FIELD

This invention relates to a tungsten sealing glass to be used for a glass tube in a fluorescent lamp which serves as a light source of a lighting equipment for a liquid crystal display device or the like.

BACKGROUND ART

Liquid crystal display devices are broadly classified, depending upon manners for utilizing light sources, into a reflection-type of liquid crystal display devices using natural light or light from room lighting, and a transmission-type of liquid crystal display devices using light from a dedicated lighting equipment, for example, a backlight device. For those applications, such as notebook-type personal computers, TV monitors, and in-vehicle instruments or indicators, which require a high-quality display, the transmission-type liquid crystal display devices with the backlight device are mainly used. For wristwatches, small-sized electronic desk calculators, and the like which are of the type especially low in power consumption, the reflection-type liquid crystal display devices are used. Recently, there are, however, some devices of the low power consumption type which have a frontlight device used by being turned on whenever needed.

The principle of emission of a fluorescent lamp serving as the light source of the backlight device or the frontlight device is similar to that of an ordinary fluorescent lamp for lighting. Specifically, a mercury gas, a xenon gas, or the like enclosed therein is excited by discharge between electrodes so that the excited gas radiates ultraviolet rays to make a phosphor applied on the inner wall surface of a glass tube emit visible light. However, the fluorescent lamp serving as the light source of the backlight device or the frontlight device is greatly different from the ordinary fluorescent lamp in that the diameter of the glass tube is small and the wall thickness thereof is thin.

Conventionally, for the glass tube of the fluorescent lamp of this type, use has been made of a lead-soda soft glass because of easiness in workability and long-period achievements as a glass for illumination. As seal-in metal, use has been made of Dumet which is inexpensive.

As the liquid crystal display devices become smaller in thickness, lighter in weight, and lower in power consumption, the fluorescent lamp is also required to be smaller in diameter and thinner in wall thickness. However, the smaller diameter of the fluorescent lamp is structurally accompanied by a decrease in mechanical strength and an increase in heat generation of the lamp so that the glass tube is required to be high in strength and low in expansion. Further, in order to improve a luminous efficiency, development is made of a lighting circuit operated at a higher frequency. Consequently, the glass tube as an insulator is required to be high in volume resistivity and low in dielectric loss. Therefore, it is no longer possible for the conventional lead-soda soft glass material to satisfy the above-mentioned requirements.

In view of the above, consideration has been made of production of the fluorescent lamps by the use of a borosilicate hard glass which is high in thermal and mechanical strengths and advantageous in respect of electrical insulation in comparison with the lead-soda soft glass. As a result, a fluorescent lamp has been developed and commercialized which use a tungsten sealing glass and a tungsten metal already known as a combination of a hermetically sealable hard glass and a metal.

However, the above-mentioned glass tube of the fluorescent lamp for the backlight device is produced by directly using conventional tungsten sealing glass of a borosilicate material which has been generally used for a xenon flash lamp and simply by shaping and processing the material into a narrow tube, and therefore, has the following problems (i) through (iv).

(i) The glass is discolored by ultraviolet rays radiated from the excited mercury gas or the like (so-called ultraviolet solarization) of the glass. The discoloration of the glass causes decrease in brightness or deviation in luminous colors, leading to deterioration in quality of the liquid crystal display device.

(ii) The glass is a diversion of one originally intended to use for the xenon flash lamp and is, therefore, designed so as to allow transmission of a certain amount of ultraviolet rays in order to endure flashing of the xenon flash lamp. However, in case of use for the fluorescent lamp, such transmission of the ultraviolet rays causes discoloration and deterioration of other component parts in the backlight device or the frontlight device, for example, a light-guiding plate and a reflection plate made of resin.

(iii) Due to extremely high devitrification, the glass is liable to be devitrified and deteriorated during formation of the tube glass. It is therefore difficult to produce the glass tube with high dimensional accuracy. When the glass tube poor in dimensional accuracy is used, uniform application of the phosphor is impossible, resulting in nonuniform brightness. Moreover, in an optical system comprising the fluorescent lamp, the light-guiding plate, and the reflection plate, it is impossible to assemble these component parts together exactly in conformity with designed dimensions. This results in a decrease or a nonuniformity in brightness of a backlight device unit or a frontlight device unit itself.

(iv) Since the volume resistivity of the glass at 250° C. is about $10^{8.5}$ Ω·cm, electrical insulation is not sufficient. In case where the fluorescent lamp has a small diameter, a long size, and a high brightness, a voltage to be applied for lighting is high and reaches several hundred volts. However, in a conventional glass which is not high in electrical insulation, a leakage occurs to cause heat generation. In the worst case, the glass may be melted so that the function as the lamp will be lost completely.

It is therefore an object of the present invention to provide a tungsten sealing glass which is excellent in ultraviolet solarization resistance, ultraviolet shielding, devitrification, and electrical insulation and is therefore suitable for a glass tube of a fluorescent lamp for use in a backlight device or a frontlight device.

DISCLOSURE OF THE INVENTION

According to the present invention, there is provided a tungsten sealing glass for use in a fluorescent lamp, which has a composition of, by mass percent, 65–76% $SiO_2$, 10–25% $B_2O_3$, 2–6% $Al_2O_3$, 0.5–5.8% $MgO+CaO+SrO+BaO+ZnO$, 3–8% $Li_2O+Na_2O+K_2O$, 0.01–4% $Fe_2O_3+CeO_2$, 0–10% $TiO_2+Sb_2O_3+PbO$, and 0–2% $ZrO_2$, where $Na_2O/(Na_2O+K_2O) \leq 0.6$.

BEST MODE FOR EMBODYING THE INVENTION

Prior to describing examples of the present invention, description will at first be made as regards reasons of limitation of each component of a tungsten sealing glass for use in a fluorescent lamp of the present invention.

In the tungsten sealing glass for use in the fluorescent lamp according to the present invention, the reasons why the content of each component is limited as mentioned above are as follows.

First, $SiO_2$ is a main component essential to formation of a glass network, and its content is 65–76%, preferably 68–74%. When $SiO_2$ is more than 76%, the devitrification dramatically becomes high. Further, a long time is required to melt a silica material, which is not suitable for mass production. In addition, the coefficient of thermal expansion of the glass becomes too small to conform to that of tungsten so that sealing becomes difficult. On the other hand, when $SiO_2$ is less than 65%, chemical durability is deteriorated to cause browning on the glass surface so that the transmittance is decreased. This results in a decrease in brightness of the fluorescent lamp. Furthermore, the coefficient of thermal expansion of the glass becomes too large to conform to that of tungsten so that sealing becomes difficult.

$B_2O_3$ is a component necessary for improvement of meltability, adjustment of viscosity, and improvement of chemical durability. Its content is 10–25%, preferably 13–19%. When $B_2O_3$ is more than 25%, there arise problems that evaporation from a glass melt is increased so that a homogeneous glass can not be obtained, and that evaporation occurs during hot working in a lamp production process to contaminate component parts. In addition, the chemical durability of the glass is deteriorated. On the other hand, less than 10% of $B_2O_3$ results in an excessively high viscosity which makes melting and working difficult.

$Al_2O_3$ is a component for considerably improving the devitrification of the glass. Its content is 2–6%, preferably 2.3–4.5%. When $Al_2O_3$ is more than 6%, the viscosity of the glass melt becomes excessively high so that a glass without bubbles and striae can not be obtained. On the other hand, when $Al_2O_3$ is less than 2%, the above-mentioned effects can not be obtained, and production of a homogeneous glass or stable forming becomes difficult.

In the present invention, it is preferable to adjust $SiO_2$ and $Al_2O_3$ so that $Al_2O_3/(SiO_2+Al_2O_3)$ falls within a range of 0.032–0.055 in mass ratio. If this value is equal to 0.032 or more, a liquidus viscosity becomes equal to $10^5$ dPa·s or more, leading to the improvement of the devitrification. In this event, stable production at an industrial level is facilitated. However, if the above-mentioned mass ratio exceeds 0.055, melting of the glass becomes difficult.

MgO, CaO, SrO, BaO, and ZnO have effects of decreasing the viscosity of the glass melt to facilitate the melting and of improving the chemical durability of the glass. As regards the contents, the total amount is 0.5–5.8%, preferably 1–4%. When the total amount of these components is more than 5.8%, devitrification or phase separation occurs in the glass so that a glass high in homogeneity or transparency can not be obtained. On the other hand, the total amount of these components being less than 0.5% deteriorates the meltability or the chemical durability.

Among the above-mentioned components, especially BaO is large in effect of decreasing the viscosity and is weak in action of causing devitrification or phase separation in the glass, in comparison with MgO or CaO. Therefore, this component is preferably contained in a ratio of 0.1–4%, especially 0.5–3% in the present invention. When BaO is more than 4%, devitrification occurs. Less than 0.1% makes it impossible to obtain the above-mentioned effect. As regards the contents of MgO, CaO, SrO, and ZnO, 0–3% (especially 0–1.5%) MgO, 0–3% (especially 0–1.5%) CaO, 0–5% (especially 0–2%) SrO, and 0–5% (especially 0–2%) ZnO are preferable. When the content of each component exceeds the above-mentioned range, devitrification or phase separation occurs, making it difficult to obtain a transparent glass.

$Li_2O$, $Na_2O$, and $K_2O$, which are alkali metal oxides, are components to be added in order to facilitate the melting of the glass and to adjust the coefficient of thermal expansion or the viscosity. As regards their contents, the total amount is 3–8%, preferably 4–7%. When the total amount of these components is more than 8%, the coefficient of thermal expansion becomes too large to be adapted to tungsten sealing. In addition, the chemical durability is considerably decreased. On the other hand, when the total amount of these components is less than 3%, vitrification is difficult and the coefficient of thermal expansion becomes excessively small.

As regards the contents of $Li_2O$, $Na_2O$, and $K_2O$, 0–3% (especially 0.1–2%) $Li_2O$, 0–5% (especially 0.5–3%) $Na_2O$, and 0.5–7% (especially 1–6%) $K_2O$ are preferable. When the content of $Li_2O$ exceeds 3%, phase separation is liable to occur. When $Na_2O$ exceeds 5%, the coefficient of thermal expansion becomes excessively large. Further, weather resistance is deteriorated. When $K_2O$ exceeds 7%, the coefficient of thermal expansion tends to be large. On the other hand, less than 0.5% makes the coefficient of thermal expansion small and vitrification difficult.

In the present invention, it is important to adjust $Na_2O$ and $K_2O$ so that $Na_2O/(Na_2O+K_2O)$ is equal to 0.6 or less in mass ratio. If this value exceeds 0.6, the electrical insulation is not sufficient. On the other hand, when the value is equal to 0.6 or less, the volume resistivity at 250° C. is $10^{8.7}$ Ω·cm or more so that a high electrical insulation is achieved.

$Fe_2O_3$ and $CeO_2$ are components which absorb wavelengths within the ultraviolet range to enhance an ultraviolet shielding characteristic. By enhancing the ultraviolet shielding characteristic of the glass, it is possible to make ultraviolet solarization difficult to occur. As regards their contents, the total amount is 0.01–4%, preferably 0.015–1%. When the total amount of these components exceeds 4%, absorption of visible light is increased so that the brightness and a color tone necessary for the fluorescent lamp can not be obtained. On the other hand, when it is less than 0.01%, no effect is exhibited.

As regards the contents of $Fe_2O_3$ and $CeO_2$, 0–1% (especially 0–0.5%) $Fe_2O_3$ and 0–4% (especially 0–3%) $CeO_2$ are preferable. When the content of $Fe_2O_3$ exceeds 1%, coloring tends to be remarkable. When $CeO_2$ exceeds 4%, devitrification is liable to occur simultaneously with the coloring. From the viewpoint of material costs, it is preferable to use $Fe_2O_3$ alone. In this case, in order to obtain a sufficient ultraviolet shielding effect, it is preferable to contain 0.01% or more $Fe_2O_3$.

All of $TiO_2$, $Sb_2O_3$, and PbO are components providing the glass with a high ultraviolet solarization resistance. The total amount is 0–10%, preferably 0.05–10%, more preferably 0.1–3%. When the total amount of these components exceeds 10%, devitrification or coloring occurs in the glass so that a transparent glass without color variation can not be obtained.

As regards the contents of $TiO_2$, $Sb_2O_3$, and PbO, 0–10% (especially 0.1–5%) $TiO_2$, 0–10% (especially 0–1%) PbO, and 0–2% (especially 0–1%) $Sb_2O_3$ are preferable. When $TiO_2$ exceeds 10%, the glass itself is easily colored and devitrification characteristic becomes drastically high. Consequently, it is difficult to obtain a transparent and homogeneous glass. When PbO exceeds a prescribed amount, the glass itself is easily colored, like $TiO_2$. Further, evaporation occurs during the melting so that a homogeneous glass is hardly obtained and such evaporation is unfavorable to the environment. Moreover, when $Sb_2O_3$ exceeds a prescribed amount, it is difficult to obtain a homogeneous glass.

PbO and $Sb_2O_3$ being excessively contained in the glass is not preferable because the glass is colored brown or black by the hot working during the production process of the fluorescent lamp. From environmental reasons, it is preferable to use $TiO_2$ as far as it is possible.

$ZrO_2$ is a component for improving weather resistance. The content is 0–2%, preferably 0–1%. When $ZrO_2$ exceeds 2%, devitrification characteristic becomes high.

In addition to the above-mentioned components, it is possible to add other components such as $P_2O_5$, $SO_3$, F, and Cl for the purpose of adjusting the viscosity of the glass and improving the weather resistance, the meltability, the fineness, and the like.

The tungsten sealing glass of the present invention with the above-mentioned composition has the coefficient of thermal expansion of $34$–$43 \times 10^{-7}/°C$. in the temperature range of 30–380° C., the liquidus viscosity of $10^5$ dPa·s or more, and the volume resistivity of $10^{8.7}$ Ω·cm or more at 250° C. In addition, the glass has characteristics such that the ultraviolet solarization resistance and the ultraviolet shielding characteristic are high.

Now, description will be made of the tungsten sealing glass according to the present invention in conjunction with examples.

The following Tables 1–4 show Examples of the present invention (Samples Nos. 1–20), while the following Table 5 shows Comparative Examples (Samples Nos. 21 and 22). Here, Sample No. 21 is a conventional tungsten sealing glass used in a fluorescent lamp. This conventional glass has been originally developed for a xenon flash lamp.

TABLE 1

| | Examples | | | | |
|---|---|---|---|---|---|
| | 1 | 2 | 3 | 4 | 5 |
| $SiO_2$ | 72.3 | 71.8 | 71.6 | 73.2 | 70.5 |
| $B_2O_3$ | 16.0 | 17.0 | 17.0 | 13.0 | 17.0 |
| $Al_2O_3$ | 2.5 | 4.0 | 4.0 | 4.5 | 4.0 |
| CaO | — | 0.5 | — | — | — |
| SrO | — | — | — | 3.0 | 0.8 |
| BaO | 3.0 | 1.1 | 1.5 | — | 0.8 |
| ZnO | — | — | — | — | 1.0 |
| $Li_2O$ | — | 0.1 | — | — | — |
| $Na_2O$ | 2.8 | 2.9 | 2.0 | 2.8 | 0.3 |
| $K_2O$ | 2.8 | 2.3 | 3.3 | 2.8 | 5.0 |
| $TiO_2$ | 0.5 | 0.1 | 0.5 | — | 0.5 |
| $Sb_2O_3$ | — | 0.1 | — | 0.6 | — |
| $Fe_2O_3$ | 0.015 | 0.015 | 0.010 | 0.020 | 0.010 |
| $CeO_2$ | — | — | 0.05 | — | 0.1 |
| Cl | 0.1 | 0.1 | 0.1 | 0.1 | 0.1 |
| $Al_2O_3/(SiO_2 + Al_2O_3)$ | 0.033 | 0.053 | 0.053 | 0.058 | 0.054 |
| $Na_2O/(Na_2O + K_2O)$ | 0.50 | 0.56 | 0.38 | 0.50 | 0.06 |

TABLE 2

| | Examples | | | | |
|---|---|---|---|---|---|
| | 6 | 7 | 8 | 9 | 10 |
| $SiO_2$ | 70.1 | 70.0 | 72.0 | 71.2 | 69.6 |
| $B_2O_3$ | 17.0 | 17.0 | 17.0 | 18.0 | 18.0 |
| $Al_2O_3$ | 4.0 | 4.0 | 3.5 | 3.5 | 4.8 |
| SrO | — | 0.8 | 0.8 | 0.8 | 0.8 |
| BaO | 1.5 | 0.8 | 0.8 | 0.8 | 0.8 |
| $Li_2O$ | — | — | 0.3 | 1.0 | — |
| $Na_2O$ | 2.7 | 2.7 | 2.3 | 1.7 | 2.7 |
| $K_2O$ | 2.7 | 2.7 | 2.7 | 2.7 | 2.7 |
| $TiO_2$ | 1.0 | 2.0 | 0.5 | 0.4 | 0.5 |
| $Sb_2O_3$ | — | 0.2 | — | — | — |
| PbO | 1.0 | — | — | — | — |
| $Fe_2O_3$ | 0.015 | 0.020 | 0.015 | 0.015 | 0.014 |
| $CeO_2$ | — | — | — | 0.05 | — |
| Cl | 0.1 | — | 0.1 | 0.1 | 0.1 |
| $Al_2O_3/(SiO_2 + Al_2O_3)$ | 0.054 | 0.054 | 0.046 | 0.047 | 0.065 |
| $Na_2O/(Na_2O + K_2O)$ | 0.50 | 0.50 | 0.46 | 0.39 | 0.50 |

TABLE 3

| | Examples | | | | |
|---|---|---|---|---|---|
| | 11 | 12 | 13 | 14 | 15 |
| $SiO_2$ | 71.6 | 70.0 | 69.6 | 70.1 | 70.0 |
| $B_2O_3$ | 17.0 | 17.0 | 20.0 | 17.5 | 18.5 |
| $Al_2O_3$ | 4.0 | 4.0 | 3.5 | 3.5 | 3.8 |
| MgO | — | — | — | — | 0.2 |
| CaO | — | — | — | 0.5 | 0.5 |
| SrO | 0.8 | 0.8 | — | — | — |
| BaO | 0.8 | 0.8 | 1.0 | 1.0 | 1.0 |
| $Li_2O$ | — | — | 0.5 | 0.7 | 0.5 |
| $Na_2O$ | 3.0 | 3.7 | 2.9 | 2.6 | 1.4 |
| $K_2O$ | 2.3 | 2.7 | 1.9 | 1.8 | 3.5 |
| $TiO_2$ | 0.5 | 0.1 | 0.5 | 2.0 | 0.5 |
| $Sb_2O_3$ | — | — | — | 0.1 | — |
| $Fe_2O_3$ | 0.025 | 0.010 | 0.016 | 0.010 | 0.015 |
| $CeO_2$ | — | 1.0 | — | 0.05 | — |
| Cl | 0.1 | 0.1 | 0.1 | 0.1 | 0.1 |
| $Al_2O_3/(SiO_2 + Al_2O_3)$ | 0.053 | 0.054 | 0.048 | 0.048 | 0.051 |
| $Na_2O/(Na_2O + K_2O)$ | 0.57 | 0.58 | 0.60 | 0.59 | 0.29 |

TABLE 4

| | Examples | | | | |
|---|---|---|---|---|---|
| | 16 | 17 | 18 | 19 | 20 |
| $SiO_2$ | 68.0 | 72.0 | 69.0 | 68.5 | 70.0 |
| $B_2O_3$ | 18.5 | 15.8 | 18.5 | 18.2 | 17.0 |
| $Al_2O_3$ | 3.8 | 3.8 | 3.8 | 3.8 | 4.0 |
| MgO | — | 0.4 | 0.4 | 0.7 | — |
| CaO | — | 0.7 | 0.7 | 1.3 | — |
| SrO | — | — | — | — | 0.8 |
| BaO | 1.0 | 1.0 | 1.0 | 0.8 | 0.8 |
| ZnO | 1.5 | 0 | — | — | — |
| $Li_2O$ | 0.5 | 0.5 | 0.5 | 0.5 | — |
| $Na_2O$ | 2.5 | 1.5 | 2.5 | 2.5 | 3.7 |
| $K_2O$ | 3.1 | 3.6 | 3.1 | 3.1 | 2.5 |
| $TiO_2$ | 0.5 | 0.5 | 0.5 | 0.3 | — |
| $Sb_2O_3$ | — | 0.1 | — | — | — |
| PbO | 0.5 | — | — | — | — |
| $Fe_2O_3$ | 0.015 | 0.013 | 0.050 | 0.015 | 0.001 |
| $CeO_2$ | — | — | — | — | 1.1 |
| $ZrO_2$ | — | 0.1 | — | 0.2 | — |
| Cl | 0.1 | 0.1 | 0.1 | 0.1 | 0.1 |
| $Al_2O_3/(SiO_2 + Al_2O_3)$ | 0.053 | 0.050 | 0.052 | 0.053 | 0.054 |
| $Na_2O/(Na_2O + K_2O)$ | 0.45 | 0.29 | 0.45 | 0.45 | 0.58 |

TABLE 5

|  | Comparative Examples | |
| --- | --- | --- |
|  | 21 | 22 |
| $SiO_2$ | 76.0 | 75.5 |
| $B_2O_3$ | 16.0 | 16.0 |
| $Al_2O_3$ | 1.3 | 1.3 |
| MgO | 0.4 | 0.4 |
| CaO | 0.7 | 0.7 |
| $Na_2O$ | 4.1 | 4.1 |
| $K_2O$ | 1.5 | 1.5 |
| $TiO_2$ | — | 0.5 |
| $Fe_2O_3$ | 0.01 | 0.015 |
| Cl | 0.1 | 0.1 |
| $Al_2O_3/(SiO_2 + Al_2O_3)$ | 0.017 | 0.017 |
| $Na_2O/(Na_2O + K_2O)$ | 0.73 | 0.73 |

At first, a glass batch was prepared to have each composition specified in the above Tables and then melted by the use of a platinum crucible at 1550° C. for 8 hours. After melting, a melt was formed into a predetermined shape and processed to thereby prepare each glass sample.

Next, each sample was subjected to measurements for a coefficient of linear expansion, a difference in spectral transmittance within a visible range before and after ultraviolet irradiation, the spectral transmittance within an ultraviolet range, the temperature and the viscosity on the liquidus curve, and the volume resistivity. Results are shown in the following Tables 6–10. The liquidus viscosity and the volume resistivity are given in logarithmic values.

TABLE 6

|  | Examples | | | | |
| --- | --- | --- | --- | --- | --- |
|  | 1 | 2 | 3 | 4 | 5 |
| Coefficient of linear expansion ($\times 10^{-7}/°$ C.) | 37.0 | 36.1 | 37.4 | 38.3 | 37.9 |
| Difference in spectral transmittance within a visible range after ultraviolet irradiation (%) | 0.8 | 1.8 | 0.7 | 0.4 | 0.8 |
| Spectral transmittance within an ultraviolet range (%) | 0.0 | 1.6 | 1.2 | 0.8 | 0.8 |
| On the liquidus curve |  |  |  |  |  |
| Temperature (° C.) | 978 | 936 | 940 | 990 | 964 |
| Viscosity | 5.3 | 5.7 | 5.6 | 5.6 | 5.4 |
| Volume resistivity | 8.9 | 9.0 | 9.1 | 8.9 | 9.5 |

TABLE 7

|  | Examples | | | | |
| --- | --- | --- | --- | --- | --- |
|  | 6 | 7 | 8 | 9 | 10 |
| Coefficient of linear expansion ($\times 10^{-7}/°$ C.) | 36.6 | 37.1 | 35.1 | 36.9 | 36.5 |
| Difference in spectral transmittance within a visible range after ultraviolet irradiation (%) | 0.4 | 0.3 | 0.9 | 1.3 | 0.5 |
| Spectral transmittance within an ultraviolet range (%) | 0.0 | 0.0 | 0.5 | 0.6 | 0.5 |
| On the liquidus curve |  |  |  |  |  |
| Temperature (° C.) | 876 | 880 | 920 | 885 | 892 |
| Viscosity | 6.4 | 6.4 | 6.0 | 6.4 | 6.2 |
| Volume resistivity | 8.9 | 8.8 | 9.0 | 9.4 | 8.9 |

TABLE 8

|  | Examples | | | | |
| --- | --- | --- | --- | --- | --- |
|  | 11 | 12 | 13 | 14 | 15 |
| Coefficient of linear expansion ($\times 10^{-7}/°$ C.) | 36.9 | 40.5 | 37.2 | 36.9 | 35.3 |
| Difference in spectral transmittance within a visible range after ultraviolet irradiation (%) | 1.1 | 1.0 | 0.9 | 0.2 | 0.8 |
| Spectral transmittance within an ultraviolet range (%) | 0.0 | 0.0 | 0.1 | 0.0 | 0.8 |
| On the liquidus curve |  |  |  |  |  |
| Temperature (° C.) | 922 | 916 | 969 | 960 | 845 |
| Viscosity | 5.9 | 5.8 | 5.0 | 5.4 | 6.5 |
| Volume resistivity | 8.7 | 8.7 | 8.8 | 8.9 | 9.5 |

TABLE 9

|  | Examples | | | | |
| --- | --- | --- | --- | --- | --- |
|  | 16 | 17 | 18 | 19 | 20 |
| Coefficient of linear expansion ($\times 10^{-7}/°$ C.) | 37.5 | 37.5 | 38.3 | 40.1 | 40.2 |
| Difference in spectral transmittance within a visible range after ultraviolet irradiation (%) | 0.9 | 0.8 | 1.2 | 1.1 | 1.2 |
| Spectral transmittance within an ultraviolet range (%) | 0.0 | 0.1 | 0.0 | 1.5 | 0.0 |
| On the liquidus curve |  |  |  |  |  |
| Temperature (° C.) | 908 | 862 | 892 | 913 | 920 |
| Viscosity | 5.6 | 6.3 | 5.7 | 5.9 | 5.8 |
| Volume resistivity | 9.1 | 9.3 | 9.1 | 9.1 | 8.7 |

TABLE 10

| | Comparative Examples | |
|---|---|---|
| | 21 | 22 |
| Coefficient of linear expansion ($\times 10^{-7}/°$ C.) | 38.0 | 38.5 |
| Difference in spectral transmittance within a visible range after ultraviolet irradiation (%) | 8.5 | 0.9 |
| Spectral transmittance within an ultraviolet range (%) | 20.0 | 0.2 |
| On the liquidus curve | | |
| Temperature (° C.) | 1050 | 1052 |
| Viscosity | 4.7 | 4.7 |
| Volume resistivity | 8.5 | 8.4 |

As apparent from the above Tables, in each of Samples Nos. 1–20 as Examples of the present invention, the coefficient of linear expansion is within the range of 35.1–40.5× $10^{-7}$/°C., a decrease in visible light transmittance due to ultraviolet irradiation is 1.8% or less, the ultraviolet transmittance is 1.6% or less, the liquidus viscosity is $10^5$ dPa·s or more, and the volume resistivity is $10^{8.7}$ Ω·cm or more.

On the other hand, in Sample No. 21 as a Comparative Example, a decrease in visible light transmittance due to ultraviolet irradiation is as large as 8.5%, the ultraviolet ray transmittance is as large as 20%, the liquidus viscosity is as small as $10^{4.7}$ dPa·s, and the volume resistivity is as low as $10^{8.5}$ Ω·cm.

In Sample No. 22, the ultraviolet ray transmittance and the decrease in visible light transmittance due to ultraviolet irradiation are improved by addition of $TiO_2$. However, the liquidus viscosity is as small as $10^{4.7}$ dPa·s and the volume resistivity is as low as $10^{8.4}$ Ω·cm.

The coefficients of linear expansion in the Tables were measured as follows. After the glass was processed into a columnar shape having a diameter of about 3 mm and a length of about 50 mm, an average coefficient of linear expansion in the temperature range of 30–380° C. was measured by the use of an automatic differential thermal dilatometer.

The ultraviolet solarization resistance was evaluated as follows. First, both surfaces of a plate-like glass having a thickness of 1 mm were polished into mirror surfaces to thereby obtain each sample. Then, measurement was made of a wavelength of light for which the sample exhibits the transmittance of 80% before ultraviolet irradiation. Further, the sample was irradiated by ultraviolet rays having a primary wavelength of 253.7 nm for 60 minutes by the use of a low-pressure mercury lamp of 40 W. Thereafter, measurement was again made of the transmittance at the wavelength for which the transmittance of 80% was exhibited before irradiation. In this manner, the decrease in transmittance due to ultraviolet irradiation was calculated. At this time, those glasses inferior in ultraviolet solarization resistance exhibited a greater decrease in transmittance. As the glass tube for use in the fluorescent lamp such as a liquid crystal backlight device, it is important to exhibit no substantial decrease.

The spectral transmittance in the ultraviolet range was measured as follows. A plate-like glass sample having a thickness of 0.3 mm with its both surfaces polished into mirror surfaces was prepared and subjected to measurement for the spectral transmittance at the wavelength of 253.7 nm. The wavelength of 253.7 nm corresponds to the emission line of mercury. In the applications of the present invention, a smaller transmittance for the above-mentioned wavelength is better.

The temperature and the viscosity on the liquidus curve were calculated as follows. First, a glass pulverized into particles having a particle size of about 0.1 mm was put in a boat-like platinum container, held in a gradient heating furnace for 24 hours, and then taken out. This sample was observed by a microscope to measure the temperature (liquidus temperature) at which an initial phase of crystals appears. Next, from the relationship between the temperature and the viscosity of the glass, which were preliminarily measured, the viscosity corresponding to the temperature of the initial phase (liquidus viscosity) was calculated.

As regards the volume resistivity, a value at 250° C. was measured by the use of a method in accordance with ASTM C-657. For instance, in case where a cold cathode fluorescent lamp with a φ2.6 tube was continuously lighted at a relatively high voltage such as several hundred volts, the temperature around the electrode sometimes exceeds 200° C. In order to prevent dielectric breakdown, the volume resistivity at 250° C. must be equal to $10^{8.7}$ Ω·cm or more.

Industrial Applicability

As described so far, the tungsten sealing glass for use in the fluorescent lamp according to the present invention has a coefficient of thermal expansion of 34–43×$10^{-7}$/°C., which is suitable for sealing with a tungsten metal, and is excellent in ultraviolet solarization resistance, ultraviolet shielding characteristic, devitrification characteristic, and electrical insulation. Therefore, the glass is advantageously used as the glass tube for use in the fluorescent lamp, especially as the glass tube material of a fluorescent lamp for use in a liquid crystal display device which is required to have a high quality.

What is claimed is:

1. A tungsten sealing glass for use in a fluorescent lamp, said glass having a composition of, by mass percent, 65–76% $SiO_2$, 10–25% $B_2O_3$, 2–6% $Al_2O_3$, 0.1–4% BaO, 0.5–5.8% MgO+CaO+SrO+BaO+ZnO, 3–8% $Li_2O+Na_2O+K_2O$, 0.01–4% $Fe_2O_3+CeO_2$, 0–10% $TiO_2+Sb_2O_3+PbO$, and 0–2% $ZrO_2$, wherein $Na_2O/(Na_2O+K_2O) \leq 0.6$.

2. A tungsten sealing glass for use in a fluorescent lamp as claimed in claim 1, characterized in that the content of $TiO_2+Sb_2O_3+PbO$ is 0.05–10%.

3. A tungsten sealing glass for use in a fluorescent lamp as claimed in claim 1, characterized in that $Al_2O_3/(SiO_2+Al_2O_3)$ is 0.032–0.055.

* * * * *